June 30, 1970
E. J. HAYES
3,517,782
DUAL BRAKING SYSTEM INCLUDING A DISC BRAKE
PISTON AND CYLINDER CONSTRUCTION
Filed Aug. 26, 1968
2 Sheets-Sheet 2
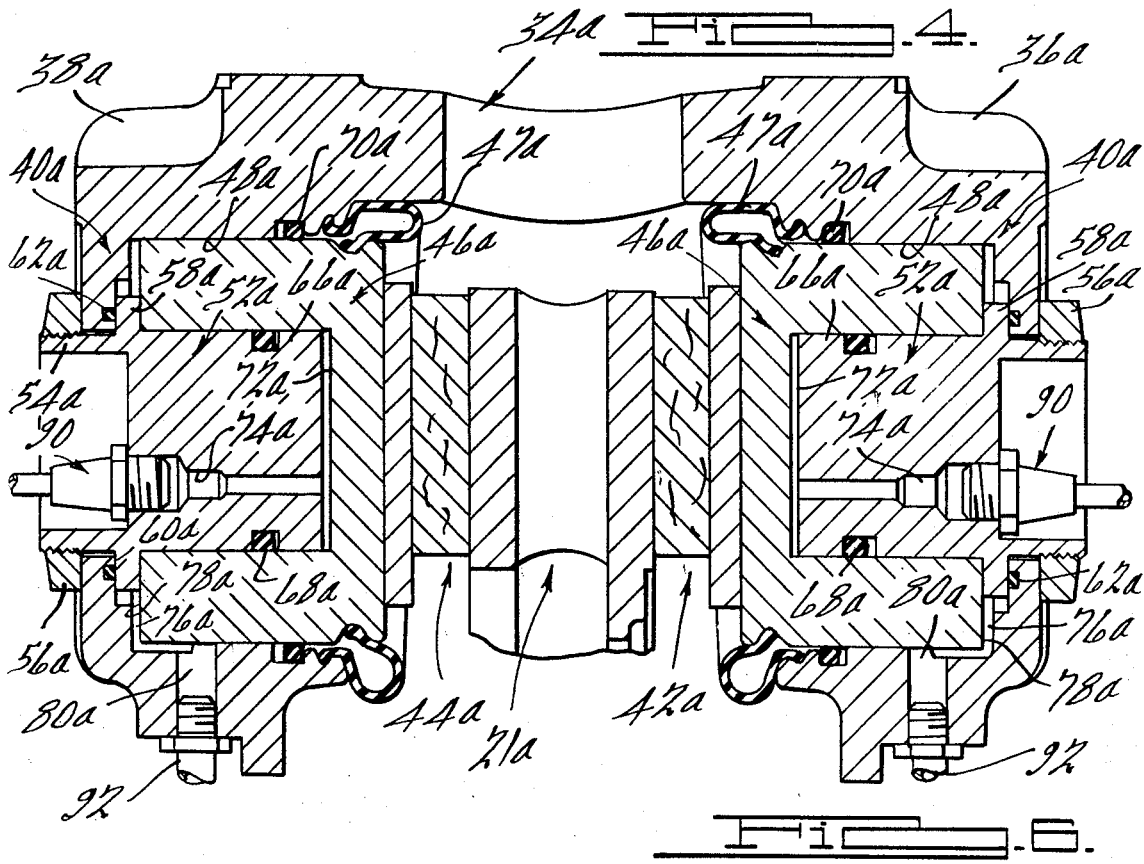
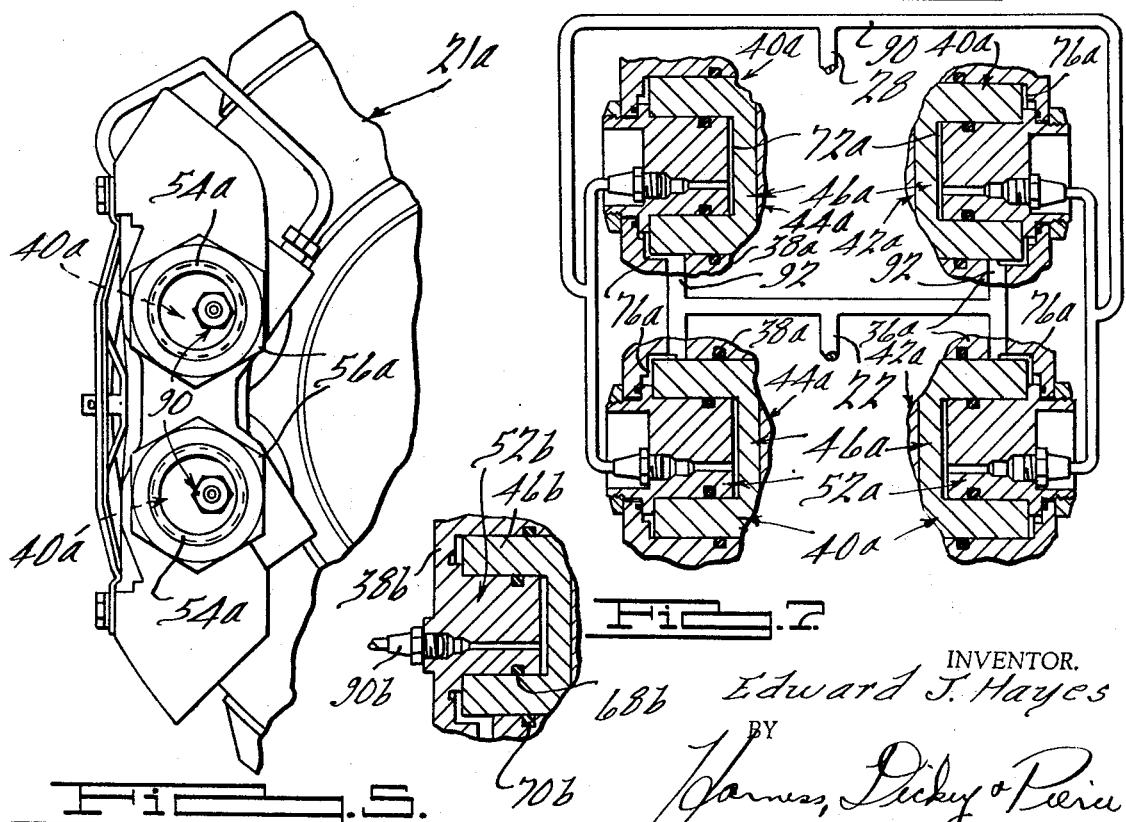
INVENTOR.
Edward J. Hayes
BY
Harness, Dickey & Pierce
ATTORNEYS United States Patent Office 3,517,782
Patented June 30, 1970

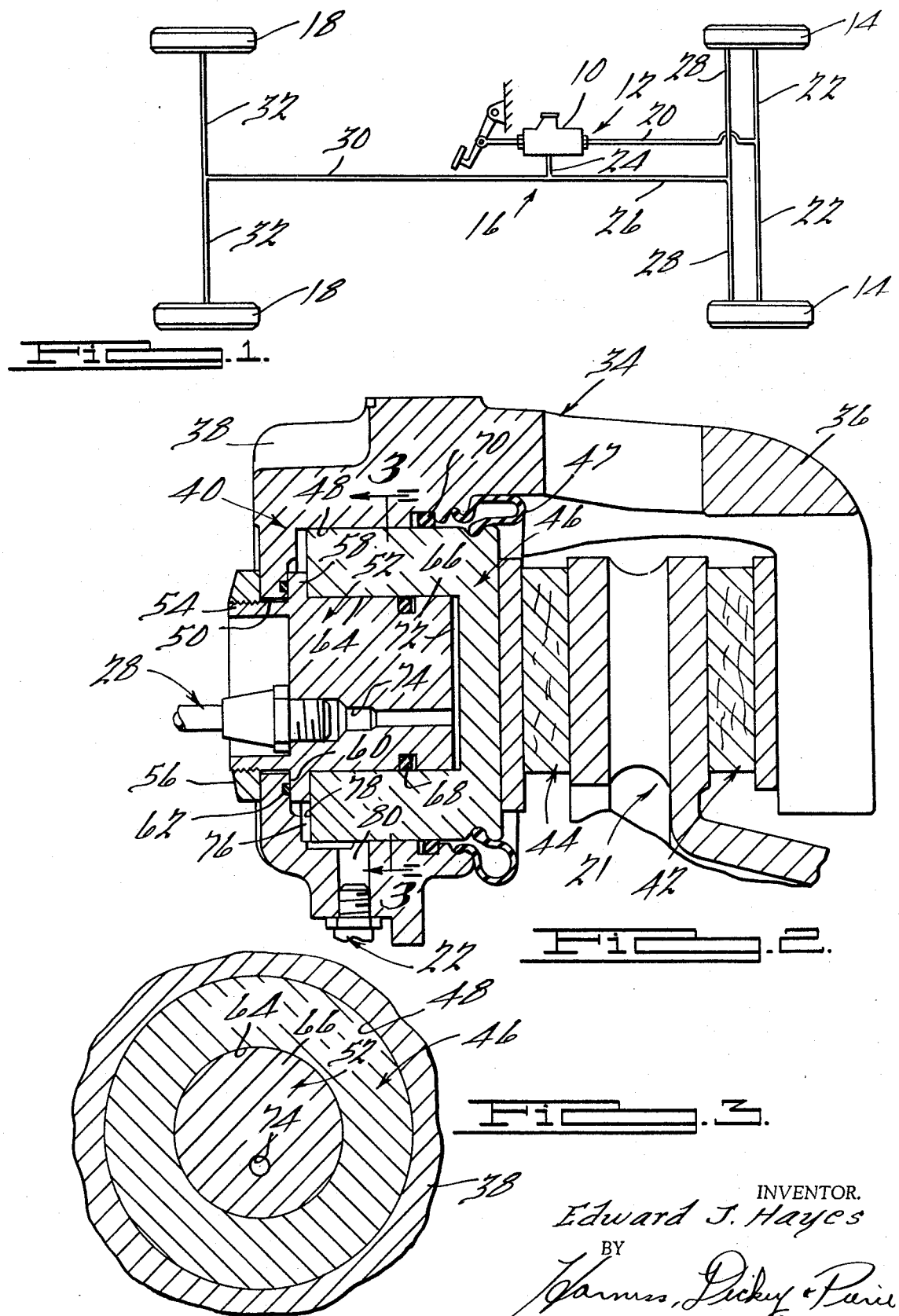

3,517,782
DUAL BRAKING SYSTEM INCLUDING A DISC BRAKE PISTON AND CYLINDER CONSTRUCTION
Edward James Hayes, Ann Arbor, Mich., assignor to Kelsey-Hayes Company, Romulus, Mich., a corporation of Delaware
Filed Aug. 26, 1968, Ser. No. 755,332
Int. Cl. B60t *11/24*
U.S. Cl. 188—152                    13 Claims

ABSTRACT OF THE DISCLOSURE

A dual braking system in which each system can provide 50% of the braking effect and including a disc brake having a piston mounted for reciprocation in a single cylinder dual chamber assembly whereby the piston can be separately actuated by fluid pressure in either chamber of the cylinder.

Summary background of the invention

In automotive vehicles having dual brake systems with dual master cylinders, it is conventional practice to have one of the master cylinder chambers connected to the front wheels and the other chamber connected to the rear wheels. In the event of failure of one system braking can still be obtained via the other system; however, with such a construction in the event of failure of one system, there will be braking available only to the fronts or to the rears. It is known that the braking effect between the front and the rear brakes of a vehicle is unequal and that in general the front wheel brakes acocunt for approximately 60% to 70% of the braking effect while the rear wheel brakes account for 30% to 40% of the braking effect, depending upon weight transfer during braking. Hence, in a conventional dual system in the event of failure of the system to the front wheels, the maximum braking effect obtainable would only be the 30% to 40% available at the rear wheels. Furthermore, it is generally recognized that a vehicle with only rear brakes is more unstable and dangerous than a vehicle having front and rear brakes or even only front brakes. It would be desirable to provide a system in which in the event of failure of either system, 50% of the braking effect would still be available and either front and rear wheel braking or front wheel braking alone would still be available, i.e. avoiding a rear wheel brake alone condition; in other words, each system would be capable of providing approximately 50% of the total braking effect. Therefore, it is an object of the present invention to provide a dual braking system in which each system provides approximately 50% of the total braking effect.

It is another object of the present invention to provide a dual braking system in which in the event of failure of either system the remaining system will provide some front wheel braking whereby the unstable condition of having rear brakes alone is eliminated.

It is another object of the present invention to provide a dual raking system in which each system provides some front wheel braking.

In accomplishing the desired effect, a novel and simple piston and cylinder construction for disc brakes has been provided. This construction not only provides a range of flexibility and simplified means for balancing the two systems but also is of a construction which is readily adaptable to present disc brake constructions with a minimum amount of modification thereto.

Therefore, it is another object of the present invention to provide a novel piston and cylinder assembly for disc brakes.

It is another object of the present invention to provide a novel piston and cylinder assembly for disc brakes for use in systems in which the disc brake piston is to be actuated from two separate sources of fluid pressure.

Other objects, features and advantages of the present invention will become apparent from the subsequent description and the appended claims, taken in conjunction with the accompanying drawings, in which:

FIG. 1 is a schematic diagram depicting a dual brake system in which each system can provide approximately 50% of the total braking effect;

FIG. 2 is a side elevational sectional view depicting the features of a piston and cylinder assembly of the present invention adapted for use with a floating caliper disc brake for use in the system of FIG. 1;

FIG. 3 is a sectional view of the apparatus of FIG. 2, taken generally along the line 3—3;

FIG. 4 is a view similar to FIG. 2 depicting the piston and cylinder assembly of FIG. 2 for use with a fixed caliper disc brake assembly;

FIG. 5 is a view of the apparatus of FIG. 4, taken generally along the line 5—5 of FIG. 4;

FIG. 6 is a schematic diagram of the hydraulic circuit for the fixed caliper disc brake of FIG. 4; and FIG. 7 is a fragmentary sectional view of a modified form of the invention.

Looking now to FIG. 1, a dual brake system is shown including a dual master cylinder 10. The dual master cylinder 10 can be of a conventional construction and is connected to a first system 12 for transmitting pressure to the brakes of the front wheels 14 and a second system 16 for transmitting pressure both to the brakes of the front wheels 14 and also the brakes to the rear wheels 18. In the system of FIG. 1, it is contemplated that the brakes of the front wheels 14 are disc brakes and those of the rear wheels would be drum and shoe type brakes. The fluid pressure to the front brakes from system 12 is supplied by means of conduits 20 and 22. The second system 16 transmits fluid pressure to the front wheels 14 via conduits 24, 26 and 28 and transmits fluid pressure to the brakes of the rear wheels 18 via conduits 24, 30 and 32. Assuming for the purposes of explanation that the front wheel brakes of a particular vehicle provide 70% of the braking effect of the vehicle with the rear wheels providing the remaining 30%, it is desirable in the event of failure of either one of the systems 12 or 16 that the remaining system provides 50% of the braking effect. This can be done by balancing the apparatus actuated by conduits 22 and 28, such that the apparatus actuated by the conduits 28 will be effective to provide at the front 20% of the total vehicle braking with the apparatus effected by conduit 22 being effective to provide at the front 50% of the total vehicle braking. In this way in the event of failure of system 12 the system 16 will still provide 50% braking by means of the 30% braking effect at the rears and the 20% braking effect at the fronts. Likewise, in the event of failure of system 16, 50% braking will still be available via the front wheel brake apparatus actuated by conduits 22. Note that in neither event is there the undesirable condition in which the braking is provided solely by the rear wheel brakes. The system of FIG. 1 could be operable in the same manner if disc brakes were employed at the rear wheels 18 as well as at the front wheels 14. The above noted system can be readily obtained for conventional disc brake constructions by means of the novel piston and cylinder assembly shown in FIGS. 2 and 3.

In FIGS. 2 and 3 the piston and cylinder assembly of the present invention is shown for use with a floating caliper disc brake. The floating caliper disc brake can be generally of the type as shown in the U.S. patent to E. J. Hayes, No. 3,375,906, issued Apr. 2, 1968, and that disclosure is incorporated herein by reference. A generally C-shaped housing or caliper 34 has legs 36 and 38 disposed on opposite sides of a rotor 21. A piston and cylinder assembly 40, embodying features of the present invention, is carried by the caliper leg 38. A first brake shoe 42 is secured to the leg 36 and a second brake shoe 44 is secured to the piston and cylinder assembly 40. As shown in the patent to Hayes the caliper 34 is of the floating type and hence actuation of the piston and cylinder assembly 40 will result in motion of the caliper 34 as the rotor 21 is engaged on opposite sides by the brake shoes 42 and 44. The piston and cylinder assembly 40 includes a cup-shaped piston 46 mounted for reciprocation within a bore 48 formed in the leg 38. The piston engages the brake shoe 44 such that reciprocation of the piston 46 will result in movement of the shoe 44. The bore 48 is connected in coaxial alignment with a bore 50 which extends through the end wall of the leg 38. A removable plug member 52 is located in bores 48 and 50 and has a rearwardly extending tubular portion 54 located in bore 50 and a forward portion 66 located in bore 48. The tubular portion 54 extends beyond leg 38 and is exteriorly threaded and has a nut member 56 located thereon whereby the plug 52 can be clamped to the end wall of the leg 38 via a flange 58 which is located between portions 54 and 66 and is engageable with a support surface 60 at the rearward end of the bore 48. An annular seal member 62 located between surface 60 and flange 58 seals the bore 48 from the bore 50. The cup-shaped piston 46 has a central bore 64 by which the piston 46 is piloted upon the forwardly extending cylindrical portion 66 of the plug 52 whereby it can reciprocate relatively thereto. An annular seal 68 located in a groove in the outer periphery of the cylindrical portion 66 provides a seal with the side wall of the bore 64 while another annular seal 70 located in an annular groove in the bore 48 provides a seal with the outside surface of the piston 46. The seals both provide piston retraction and piston stability functions. A flexible boot 47 is fixed to caliper leg 38 and to sliding piston 46 and prevents contamination of the sliding piston and cylinder bore surface. Note that with the construction as shown, a first, inner cylinder or chamber 72 is defined by the confines of the bore 64 in the piston 46 and by the cylindrical portion 66. Fluid pressure can be introduced into the chamber 72 via a passageway 74 extending through the plug 52. In the embodiment of FIG. 1, passageway 74 would be connected to conduit 28. Thus fluid pressure in line 28 as provided by the system 16 would result in movement of the piston 46 axially outwardly causing engagement of shoes 42 and 44 with the rotor 21. Seal 68 is located to prevent the loss of fluid from the chamber 72 over the full range of travel of piston 46. For the embodiment of FIG. 1 the cross-sectional area of the piston 46 as effected by the fluid pressure from conduit 28 would be sufficient to generally provide 20% of the total braking on the vehicle, i.e., which combined with the 30% at rear wheels 18 would provide 50% for system 16.

A second cylinder or chamber 76 is defined by the rearward end and radial confines of the bore 48 and the annular end face 78 of the piston 46. The cylinder 76 is in communication with passageway 80 through the leg 38 and, in the system of FIG. 1, would be connected to the conduit 22 associated with the system 12. Hence, fluid pressure from conduit 20 to conduit 22 as supplied to the system 12 would enter the chamber 76 to cause the piston 46 to be moved axially outwardly, thereby causing engagement of the shoe 42 with rotor 21 and causing movement of caliper 34 axially in the opposite direction, thereby causing engagement of shoe 44 with the rotor 21. The effective cross-sectional area of the surface 78 would be selected to provide approximately 50% of the total braking effect on the vehicle; thus, in the event of failure of the system 16, and hence loss of pressure in the cylinder or chamber 72, the pressure in the cylinder 76 would still provide for 50% of the effective braking of the vehicle. To accomplish the above the ratio of effective areas of piston 46 in chambers 72 and 76 would be approximately 2 to 5.

Note that the piston and cylinder assembly 40 as shown and described is of a relatively simple construction and can be easily adapted to conventional, existing caliper-type disc brake constructions. With the use of the design as shown, only a single piston need be utilized to provide the dual effect on brake shoes 42 and 44 in response to the two systems 12 and 16. Note also that with the construction shown substantial variation in ratios can be provided to accommodate various vehicles merely by changing the relative sizes of the cylindrical portion 66 of the plug 52 and the bore 64 of piston 46. This could be done all with the same central size bore 48. Note that the cylindrical portion 54 at the rearward end of the plug 52 is in clearance relationship with the bore 50; hence, some slight radial movement of the plug 52 can be provided such that alignment of the cylinder 46 relative to the bore 48 and also alignment of the bore 64 relative to the plug 52 is facilitated.

FIGS. 4 and 5 depict the application of the piston and cylinder assembly 40 shown in FIGS. 2 and 3 for a fixed caliper disc brake. The fixed caliper and disc brake assembly as shown in FIGS. 4 and 5 is generally of the type shown and described in the patent to Robinette, No. 3,298,469, issued Jan. 17, 1967, and the details thereof are incorporated herein by reference. In the discussion of the apparatus in FIGS. 4 and 5, components similar to like components in the apparatus shown in FIGS. 2 and 3 have been given the same numerical designations with the addition of the letter subscript $a$. Thus the fixed caliper 34$a$ has a pair of legs 36$a$ and 38$a$ which house four (two on each leg 36$a$ and 38$a$) piston and cylinder assemblies 40$a$ which are identical to the piston and cylinder assembly 40 shown in FIGS. 2 and 3. In the apparatus of FIGS. 4 and 5 brake shoe 42$a$ is secured to the two pistons 46$a$ of the piston and cylinder assemblies 40$a$ on leg 36$a$ while brake shoe 44$a$ is secured to the two pistons 46$a$ of the piston and cylinder assemblies 40$a$ on leg 38$a$. As shown schematically in FIG. 6 for the caliper 34$a$ all of the chambers 72$a$ are connected together via lines 90 and to line 28 and all of the chambers 76$a$ are connected together via lines 92 and to line 22. The advantages of assembly 40$a$ for fixed caliper 34$a$ are similar to those mentioned in the discussion of the embodiment of FIGS. 2 and 3.

In the embodiments of FIGS. 1–6, the plug 52, 52$a$ is a member separate from leg 38, 38$a$. In FIG. 7 a modified form is shown in which the plug is integral with the leg; in FIG. 7 components similar to like components in FIGS. 1–6 have been given the same numerical designation with the addition of letter $b$. Thus plug 52$b$ is formed as a part of leg 38$b$ and receives the piston 46$b$.

While it will be apparent that the preferred embodiments of the invention disclosed are well calculated to fulfill the objects above stated, it will be appreciated that the invention is susceptible to modification, variation and change without departing from the proper scope or fair meaning of the subjoined invention.

What is claimed is:

1. In a disc brake the improvement comprising: a caliper including a piston support housing having a bore, a single piston supported for reciprocation in said bore and having two separate surface areas for separate actuation by fluid pressure, chamber means including said single piston for defining with said bore two separate fluid chambers one for each of said separate surface areas whereby said single piston will be fluid actuated in response to fluid pressure in either of said chambers, said chamber means including a cylindrical plug axially extending within said bore and with said piston being cup-shaped and having an axially extending cavity receiving said plug, one of said surface areas being defined by said piston cavity, and the other of said surface areas being defined by the annular surface surrounding said piston cavity, said plug being a spearate member, and fastening means holding said plug in said bore while permitting selective radial adjustment whereby said plug can be readily aligned with said piston cavity and with said bore.

2. The disc brake of claim 1 including a first fluid passage extending through said plug to one of said chambers.

3. The disc brake of claim 1 including a first fluid passage extending through said plug to the one of said chambers defined by said piston cavity and a second fluid passage extending through said support housing to the other of said chambers.

4. The disc brake of claim 1 with a brake shoe connected with said piston.

5. The disc brake of claim 4 with said caliper being of the floating type.

6. The disc brake of claim 4 with said caliper being of the fixed type and including a pair of legs each of which including at least one of said bore, said single piston and said chamber means.

7. The disc brake of claim 1 with said surface areas having a preselected ratio whereby fluid pressure on each provides a preselected brake effect.

8. The disc brake of claim 7 in a dual brake system for a vehicle having front and rear wheels said system comprising a first brake system connected to only one of the front and rear brakes and a second brake system connected to both of the front and rear brakes, said disc brake being the front brakes with said first system connected to one of said chambers and with said second system connected to the other of said chambers.

9. The disc brake of claim 8 with said preselected ratio providing in conjunction with the rear brakes approximately 50% of the total braking effect from each of said first and second systems.

10. In a dual brake system for a vehicle having front and rear wheels with the system comprising a first brake system connected to only the front brakes and a second brake system connected to both of the front and rear brakes and with each of the front brakes being a disc brake, said disc brake comprising: a piston support housing having a bore, a single piston supported for reciprocation in said bore and having two separate surface areas for separate actuation by fluid pressure, chamber means including said single piston for defining with said bore two separate fluid chambers one for each of said separate surface areas whereby said single piston will be fluid actuated in response to fluid pressure in either of said chambers, with said single piston providing the entire braking effect for that disc brake, said surface areas having a preselected ratio whereby fluid pressure on each provides a preselected brake effect, said first system being connected to one of said chambers with said second system being connected to the other of said chambers, said preselected ratio providing in conjunction with the rear brakes approximately 50% of the total braking effect from each of said first and second systems said second braking system normally providing approximately 20% of the total vehicle braking effect at the front brakes and 30% of the total vehicle braking effect at the rear brakes.

11. The disc brake of claim 10 comprising a caliper including said support housing.

12. The disc brake of claim 11 with said chamber means including a cylindrical plug axially extending within said bore and with said piston being cup-shaped and having an axially extending cavity receiving said plug.

13. The disc brake of claim 12 with one of said surface areas being defined by said piston cavity, and with the other of said surface areas being defined by the annular surface surrounding said piston cavity.

References Cited

UNITED STATES PATENTS 2,324,007   7/1943   MacPherson.

FOREIGN PATENTS 1,409,331   7/1965   France.
1,338,610   8/1963   France.

GEORGE A. HALVOSA, Primary Examiner

U.S. Cl. X.R.

92—110, 165